United States Patent [19]
Virnig et al.

[11] Patent Number: 6,060,029
[45] Date of Patent: May 9, 2000

[54] PROCESS FOR EXTRACTION OF METALS FROM AQUEOUS AMMONIACAL SOLUTIONS WITH BETA-DIKETONE EXTRACTANTS WHILE MAINTAINING A VOLTAGE POTENTIAL TO CONTROL ENTRAINMENT OF THE AQUEOUS LAYER INTO THE ORGANIC LAYER

[75] Inventors: Michael J. Virnig, Tucson; G. Timothy Fisher, Sierra Vista; Gary A. Kordosky, Tucson, all of Ariz.

[73] Assignee: Henkel Corporation, Gulph Mills, Pa.

[21] Appl. No.: 09/295,854

[22] Filed: Apr. 21, 1999

Related U.S. Application Data

[63] Continuation-in-part of application No. 09/060,036, Apr. 13, 1998, abandoned
[60] Provisional application No. 60/044,993, Apr. 28, 1997.

[51] Int. Cl.[7] .............................. C01G 3/00; B01D 11/00; C22B 15/00; C25C 1/00
[52] U.S. Cl. .............................. 423/24; 204/567; 205/580
[58] Field of Search .................................. 423/24, 49, 54, 423/63, 70, 87, 89, 99, 112, 139, 157, 181, 508–510; 210/748; 204/567; 205/580

[56] References Cited

U.S. PATENT DOCUMENTS

| | | | |
|---|---|---|---|
| 4,039,404 | 8/1977 | Richards et al. | 423/24 |
| 4,161,439 | 7/1979 | Warren et al. | 204/306 |
| 4,175,012 | 11/1979 | MacKay et al. | 423/24 |
| 4,283,390 | 8/1981 | Davies | 210/643 |
| 4,290,882 | 9/1981 | Dempsey | 210/634 |

*Primary Examiner*—Steven Bos
*Attorney, Agent, or Firm*—John E. Drach; Henry E. Millson, Jr.

[57] ABSTRACT

Improvement in the process of extracting metals, particularly copper, from aqueous ammoniacal solutions with beta-diketone extractants dissolved in a water immiscible hydrocarbon diluent, such as a kerosene, in which the improvement comprises application of a voltage potential across the interface of the aqueous and organic layers of an extraction circuit with an electrostatic coalescer, and maintaining the voltage potential until the layers have been separated, to control entrainment of the aqueous layer into the organic layer, thereby significantly reducing metal production cost and providing improved metal quality by minimizing ammonia entrapment and carry over to the aqueous stripping solution from which the metal is recovered, typically by electrowinning of the aqueous acid strip solution.

19 Claims, No Drawings

PROCESS FOR EXTRACTION OF METALS FROM AQUEOUS AMMONIACAL SOLUTIONS WITH BETA-DIKETONE EXTRACTANTS WHILE MAINTAINING A VOLTAGE POTENTIAL TO CONTROL ENTRAINMENT OF THE AQUEOUS LAYER INTO THE ORGANIC LAYER

This application is a continuation-in-part of U.S. application Ser. No. 09/060,036 filed Apr. 13, 1998, now abandoned, which in turn claims priority from U.S. provisional application Ser. No. 60/044,993 filed Apr. 28, 1997.

BACKGROUND OF THE INVENTION

Field of the Invention

This invention relates to an improvement in the process of extracting metals, particularly copper, from aqueous ammoniacal solutions employing as the extractants beta-diketone compounds dissolved in a water immiscible hydrocarbon diluent. In particular, the improvement comprises the use of electrostatic coalescers to control entrainment of the aqueous phase in the organic extractant phase to significantly reduce metal production costs and to provide improved metal quality recovery by minimizing ammonia entrainment and carry over to the aqueous stripping solution from which the metal is recovered, typically by electrowinning of the aqueous strip solution in a tankhouse.

Beta-diketones are typically employed to extract a metal, such as copper, from aqueous ammoniacal leach liquors. A typical circuit involves two stages of extraction, a wash stage and one to two stripping stages with an aqueous acid stripping solution. Entrainment of the ammoniacal aqueous phase in the organic, and carry over to the stripping solution from which the metal is eventually recovered, results in higher metal production costs and poorer quality of the metal recovered.

Electrostatic coalescers have been employed in the past to break water in oil emulsions in the oilfields. Such coalescers have been employed in an attempt to reduce aqueous entrainment in a process of extracting copper from aqueous acidic leach solutions. Such systems from acid leach solutions, do not however pose the problems associated with ammoniacal solution entrainment, and accordingly do not solve all the entrainment problems posed in extraction of metals, particularly copper, from aqueous ammoniacal solutions.

DESCRIPTION OF THE INVENTION

In this description, except in the operating examples or where explicitly otherwise indicated, all numbers describing amounts of ingredients or reaction conditions are to be understood as modified by the word "about".

While the present invention is particularly useful in applications where ammoniacal leach solutions are encountered in the treatment of copper containing sulfidic ores, the present invention is applicable or useful in the extraction of copper from any aqueous ammoniacal solution containing copper values regardless of its source. The invention may also be employed in relation to other metals to be extracted from aqueous ammoniacal solutions, such as nickel or zinc.

In its general application accordingly the present invention is an improvement in the process of extraction and recovery of a metal, particularly copper, from aqueous ammoniacal solutions in a process comprising:

(1) contacting a metal pregnant aqueous ammoniacal solution containing metal values with a water insoluble beta-diketone metal extractant dissolved in a water immiscible organic diluent in the absence of a voltage potential to extract the metal values from said aqueous ammoniacal solution into said organic solution to form two layers, (a) a metal pregnant organic layer and (b) a metal depleted aqueous layer;

(2) applying a voltage potential across the interface between the metal pregnant organic layer and the metal depleted aqueous layer to coalesce entrained droplets of the aqueous phase present in the organic layer to substantially reduce entrainment of the aqueous phase in the organic layer;

(3) separating the metal pregnant organic layer from the metal depleted aqueous layer while maintaining the voltage potential until the separation has been completed;

(4) contacting the metal pregnant organic layer with an aqueous acidic stripping solution, whereby metal values are stripped from the organic layer into the aqueous acidic stripping solution;

(5) separating the aqueous acidic stripping solution from the organic layer; and (6) recovering the metal from said aqueous acidic stripping solution.

In the above process it is critical in step (3) to maintain the voltage potential until separation of the layers has been completed, since it has been discovered, surprisingly, that when the voltage potential is removed prior to separation, entrainment of the aqueous phase into the organic phase quickly rises to unacceptable levels.

The voltage potential in steps (2) and (3) can conveniently be obtained by the use of electrostatic coalescers.

With the use of the electrostatic coalescers the entrained coalesced aqueous phase is separated from the organic layer and returned to the aqueous layer. With application of a voltage potential across the interface of the aqueous and the organic layers, significant reduction in the entrainment of the aqueous layer in the organic layer is achieved. Typically a weakly acidic wash of the separated organic layer is carried out prior to the strong acid stripping of the metal values from the organic layer in step (4). Entrainment of the aqueous layer in the organic layer results in transfer of ammonia to the weakly acidic wash stage. Increased entrainment results in increased acid demand in the wash stage to neutralize the ammonia. Similarly, entrainment of the aqueous wash liquor in the washed loaded organic layer results in the transfer of ammonium ions to the electrowinning tankhouse and higher ammonium levels in the tankhouse will result in poorer quality of the metal recovery cathodes, which do not command a premium price in the marketplace. Also entrainment of the strip solution in the stripped organic results in transfer of acid to extraction where it neutralizes free ammonia upsetting the balance in the leaching of the metal into the ammoniacal aqueous leach solution. Commercial plant operations employing beta-diketones as the extractant in the extraction reagent comprised of a solution of the water insoluble diketone extractant in a water immiscible hydrocarbon diluent, such as a kerosene, suffer from all of the above problems. Attempts to reduce the entrainment by passing the organic layer through the usual (non-electrostatic) coalescing media have proven to be ineffective. It has now been discovered that applying a voltage potential across the interface of the organic and aqueous layers and maintaining the voltage potential until the layers have been separated successfully and significantly reduces aqueous entrainments in the beta-diketone containing organic layer, thereby minimizing, if not eliminating, all the operational problems discussed above.

As discussed above, typically a weakly acidic washing stage at a pH of about 6–7 is carried out prior to the stripping step (4) in which a strong acid stripping solution is employed and controlled and carefully maintained to ensure a pH electrolyte of about 3–4, so that the acid in the tankhouse spent must balance, or be less than the acid required to strip the metal from the organic phase. Typically the circuit incorporates sulfuric acid as a pH control, and sulfuric acid is the preferred acid stripping solution.

The beta-diketone extractants, particularly useful for extraction of metals such as copper, zinc or nickel, are more specifically defined as having the formula

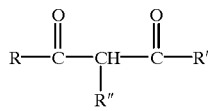

where R is phenyl or alkyl substituted phenyl, R' is alkyl, alkylsubstituted phenyl or chloro substituted phenyl and R" is H or CN with the provisos that (1) when R is phenyl, R' is a branched chain alkyl group of at least 7 carbon atoms and (2) when R is alkyl substituted phenyl, the number of carbon atoms in the alkyl substituent is at least 7 and at least one such substituent is a branched chain. R is desirably a monoalkyl substituent and preferably contains 9 or more carbon atoms. The various alkyl groups are preferably free from substitution and contain less than 20 carbon atoms. Accordingly, the alkyl groups will contain at least 7, preferably 9 or more carbon atoms, up to about 20 carbon atoms. Further, when R' is alkyl, the carbon alpha to the carbonyl group is desirably not tertiary. Preferably, R" is H, R is a branched 7, 8, 9, 12 or 17 carbon chain or a chlorophenyl or a short chain (1–5 carbon) alkyl substituted phenyl and R is phenyl or a 7, 8, 9 or 12 carbon alkyl substituted phenyl group. One preferred beta-diketone is 1-phenyl-3-isoheptyl-1,3-propanedione.

Other preferred diketones are those which are sterically hindered. Such compounds are modifications of the beta-diketones defined in the formula above in which the substituents are such as to provide a sterically hindered beta-diketone. The sterically hindered diketones can be represented by the formula [II] below:

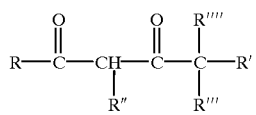

[II]

The hindered beta-diketones are those where R is phenyl or alkyl substituted phenyl, R' is alkyl, and R", R'" and R"" are the same or different and are chosen from the group consisting of H, alkyl having from 1 to about 8 carbon atoms, and aralkyl having from 7 to about 14 carbon atoms, with the proviso that (a) no more than two of R", R'" and R"" are H and (b) the total number of carbons in all R groups is at least 13. Preferred compounds are those in which (i) R is phenyl, R" is methyl or benzyl, R' is branched hexyl, and R'" and R"" are H; (ii) R is phenyl, R" is H, R' is butyl, R'" is ethyl and R"" is H, and (iii) R is phenyl, R" is H, R' is a straight or branched chain alkyl group containing from 5–8 carbon atoms and R'" and R"" are methyl.

In the process of extraction a wide variety of water immiscible liquid hydrocarbon solvents can be used in the metal recovery process to form the organic layer in which the diketone extractant is dissolved. These include aliphatic and aromatic hydrocarbons such as kerosenes, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are CHEVRON™ ion exchange solvent (available from Standard Oil of California) having a flash point of 195° Fahrenheit; ESCAID™ 100 and 110 (available from Exxon-Europe) having a flash point of 180° Fahrenheit; NORPAR™ 12 (available from Exxon-USA) with a flash point of 160° Fahrenheit; CONOCO™ C1214 (available from Conoco) with a flash point of 160° Fahrenheit; and Aromatic 150 (an aromatic kerosene available from Exxon-USA having a flash point of 150° Fahrenheit), and other various kerosenes and petroleum fractions available from other oil companies, such as the ORFORM™ SX series of solvent extraction diluents (available from Phillips 66: SX 1, 7, 11, and 12 each having a Flash Point above 150° F. varying up to 215° F.); and ESCAID™ series of hydrocarbon diluents (available from Exxon: 100, 110, 115, 120, 200 and 300, each having a Flash Point above 150° F.; and EXXOL™ D80 solvent (also available from Exxon and having a Flash Point above 150° F.).

In the extraction process, the organic solvent solutions may contain the beta-diketone in an amount approaching 100% solids, but typically the diketone will be employed in an amount of about 20–30% by weight.

In the process, the volume ratios of organic to aqueous (O:A) phase will vary widely since the contacting of any quantity of the oxime organic solution with the metal containing aqueous solution will result in the extraction of metal values into the organic phase. For commercial practicality however, the organic(O) to aqueous(A) phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable. It is preferable to strip at elevated temperatures. While the entire operation can be carried out as a batch operation, most advantageously the process is carried out continuously with the various streams or solutions being recycled to the various operations in the process for recovery of the metal, including the leaching, extraction and the stripping steps.

In the extraction process the extractant should be soluble in the organic water-immiscible solvent. In general the diketones of the present invention will be soluble to such an extent and amount described above. If necessary or desirable to promote specific desired properties of extraction, solubility modifiers generally known in the art may be employed. Such modifiers include long chain (6–30) carbon aliphatic alcohols or esters such as n-hexanol, n-2-ethylhexanol, isodecanol, isohexadecanol, 2-(1,3,3 trimethylbutyl)- 5,7,7-trimethyl octanol and 2,2,4-trimethyl-1,3-pentanediol mono-or di- isobutyrate, long chain phenols, such as heptylphenol, octylphenol, nonylphenol and dodecylphenol; and organo phosphorous compounds such as tri-lower alkyl (4–8 carbon atom) phosphates especially tributyl phosphate and tri-(2-ethylhexyl) phosphate. Where indicated to be desirable, kinetic additives may also be employed.

In the stripping step (4), a sulfuric acid solution containing greater than about 5 to about 200 g/l sulfuric acid is the preferred stripping agent as it permits the subsequent recovery of the copper by conventional recovery steps either in the form of copper sulphate crystals or by electrowinning to cathode copper. Electrowinning is typically the preferred means of recovery of the metals from solutions suitable for electrowinning. Other mineral acids may be used such as hydrochloric or nitric; however, such may require other recovery methods or specialized handling equipment.

The invention can be further illustrated by the following example.

EXAMPLE

In this example, the extraction circuit employed one extraction stage, one wash stage and one stripping stage to illustrate the invention. The aqueous ammoniacal feed solution was a standard commercial feed containing 30 gpl Cu, 1.5 gpl Zn, 38 gpl ammonia, 55 gpl sulfate. The organic phase was a commercial organic phase of 1-phenyl-3-isoheptyl-1,3-propanedione dissolved in kerosene. Aqueous entrainment, without any coalescer treatment, in the loaded organic layer averaged 9500 ppm. When a 5000 VAC (volts alternating current) potential was applied across the interface between the organic layer and the aqueous layer, the aqueous entrainment was reduced to 1500 ppm. When the voltage was turned off and the two layers allowed to remain in contact, the aqueous entrainment level returned to 9500 ppm within a short period of time.

Based on the foregoing example, the use of electrostatic coalescers, applying a voltage potential across the interface of the aqueous and organic layers in an extraction circuit employing a beta-diketone extractant and using the process of the invention will successfully and significantly reduce the aqueous entrainment in the organic extractant phase.

As indicated earlier, the present invention is particularly useful in regard to recovery of copper from aqueous ammoniacal solutions. Such solutions are found from a variety of sources such as those encountered in leaching of chalcocite concentrates. In such applications the copper pregnant leach solutions from which the copper is to be recovered by extraction will contain on the order of about 15–170 g/l copper and typically about 30–40 g/l copper at a pH of about 8.5 to 11. In solutions encountered from other applications, the solutions may contain copper at higher levels, on the order of 125–170 g/l, such as solutions encountered in ammoniacal copper chloride printed board etchants.

What is claimed is:

1. A process for the extraction of a metal from an aqueous ammoniacal solution containing the metal values comprising the steps of:
(A) contacting a metal pregnant aqueous ammoniacal solution containing metal values with a solution of a water insoluble beta-diketone metal extractant dissolved in a water-immiscible organic diluent in the absence of a voltage potential, to extract metal values from said aqueous ammoniacal solution into said organic solution and to form two layers, (a) a metal pregnant organic layer and (b) a metal depleted aqueous layer;
(B) applying a voltage potential across the interface between the metal pregnant organic layer and the metal depleted aqueous layer to coalesce entrained droplets of the aqueous phase present in the organic layer to reduce entrainment of the aqueous phase in the organic layer;
(C) separating the metal pregnant organic layer from the metal depleted aqueous layer while maintaining the voltage potential until the separation has been completed;
(D) contacting the metal pregnant organic layer with an aqueous acidic stripping solution, to strip metal values from the organic layer into the aqueous acidic stripping solution;
(E) separating the aqueous acidic stripping solution from the organic layer; and
(F) recovering the metal from said aqueous acidic stripping solution.

2. The process of claim 1 wherein the metal is copper.

3. The process of claim 1 wherein the beta-diketone has the formula

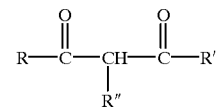

where R is phenyl or alkyl substituted phenyl, R' is alkyl, alkylsubstituted phenyl or chloro substituted phenyl and R" is H or CN with the provisos that (1) when R is phenyl, R' is a branched chain alkyl group of at least 7 carbon atoms and (2) when R is alkyl substituted phenyl, the number of carbon atoms in the alkyl substituent is at least 7 and at least one such substituent is a branched chain.

4. The process of claim 1 wherein the beta-diketone has the formula

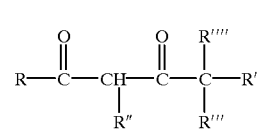

wherein R is phenyl or alkyl substituted-phenyl, R' is alkyl, and R", R'" and R"" are the same or different and are chosen from the group consisting of H, alkyl having from 1 to about 8 carbon atoms, and aralkyl having from 7 to about 14 carbon atoms, with the proviso that (a) no more than two of R", R'" and R"" are H and (b) the total number of carbons in all R groups is at least 13.

5. The process of claim 4 wherein R is phenyl, R" is methyl or benzyl, R' is branched hexyl and R'" and R"" are H.

6. The process of claim 4 wherein R is phenyl, R" is H, R' is butyl, R'" is ethyl and R"" is H.

7. The process of claim 4 wherein R is phenyl, R" is H, R' is a branched chain alkyl group having from 5–8 carbon atoms and R'" and R"" are methyl.

8. The process of claim 4 wherein the sterically hindered beta-diketone is one in which an alkyl or aralkyl substituent having from 1 to 7 carbon atoms is attached to the carbon atom joining the two carbonyl groups of the beta-diketone.

9. The process of claim 4 wherein R" is selected from the group consisting of methyl and benzyl.

10. The process of claim 1 wherein the diketone extractant is 1-phenyl-2-methyl-3-isoheptyl-1,3-propane dione.

11. The process of claim 1 wherein the diketone extractant is 1-phenyl-2-benzyl-3-isoheptyl-1,3-propane dione.

12. The process of claim 1 wherein the diketone extractant is 1-phenyl-4-ethyl-1,3-octanedione.

13. The process of claim 1 wherein the diketone is 1-phenyl-3-(ethylpentyl)-1,3-propanedione.

14. The process of claim 1 wherein the diketone is 1-phenyl-4,4-dimethyl-1,3-undecanedione.

15. The process of claim 1 wherein the diketone is 1-phenyl-3-isoheptyl-1,3-propanedione.

16. The process of claim 1 wherein prior to the stripping step (D), the metal pregnant organic phase is washed with a weakly acidic aqueous solution having a pH of 6 to 7.

17. The process of claim 16 wherein the weakly acidic aqueous solution is a sulfuric acid solution.

18. The process of claim 1 wherein the aqueous acidic stripping solution in step (D) is a sulfuric acid solution containing greater than about 5 to about 200 grams per liter sulfuric acid.

19. The process of claim 1 in which the metal values are recovered in step (F) by electrowinning.

* * * * *